1,618,794

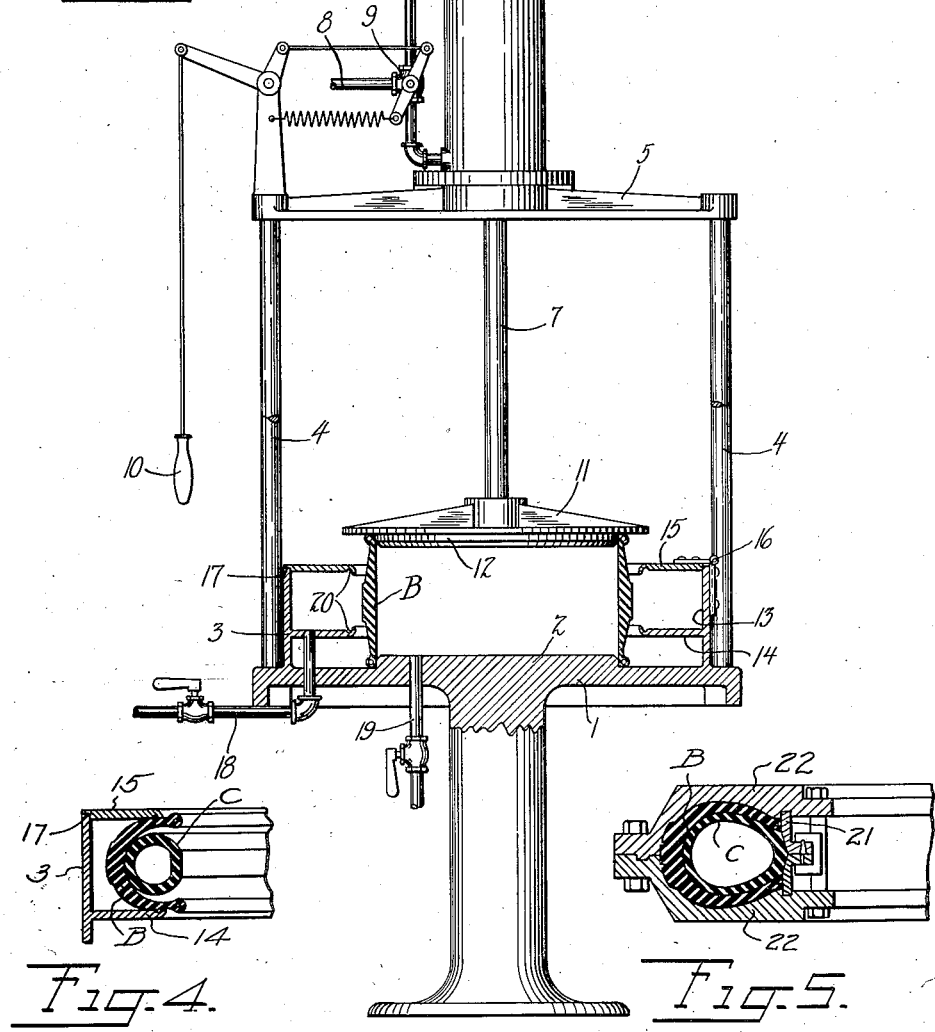
Feb. 22, 1927.
A. O. ABBOTT, JR
1,618,794
APPARATUS FOR MANUFACTURING TIRE CASINGS
Original Filed Aug. 8, 1923
Inventor
ADRIAN O. ABBOTT, JR.
By his Attorney Patented Feb. 22, 1927.

UNITED STATES PATENT OFFICE.

ADRIAN OREN ABBOTT, JR., OF DETROIT, MICHIGAN, ASSIGNOR TO MORGAN & WRIGHT, OF DETROIT, MICHIGAN, A CORPORATION OF MICHIGAN.

APPARATUS FOR MANUFACTURING TIRE CASINGS.

Original application filed August 8, 1923, Serial No. 656,382. Patent No. 1,507,563, dated September 9, 1924. Divided and this application filed June 25, 1924. Serial No. 722,202.

This invention is concerned with the shaping and vulcanization of tire casings for motor vehicles which have been built on a "drum" (flat or crowned) as distinguished from a "core". It aims generally to provide an economic method of manufacture capable of performance with simple and inexpensive apparatus. More particularly, it endeavors to provide a method of manufacture that may be carried on rapidly, that requires very little manipulation, that minimizes the number of operatives required, and that is simple and practical of execution in a factory. These are some of the objects of the invention, other advantages hereof will appear in the subsequent detailed description. This application is a division of a previously filed application, Serial Number 656,382, filed August 8, 1923, now Patent No. 1,507,563.

With a preferred embodiment in mind, but without intention to limit its scope more than is required by the prior art the invention, briefly stated, consists in pneumatically distending a pulley-band with air in direct contact with its interior into sealing engagement with the edges of a vacuum chamber and thereafter vacuously completing the shaping of the casing after which a vulcanizing bag is introduced and the casing vulcanized in a mold under internal pressure, applied to the bag.

A preferred embodiment of the invention is illustrated in the accompanying drawings in which—

Figure 1 is an elevation partly in section of a preferred form of the apparatus.

Figures 2, 3, and 4 are fragmentary sections showing successive stages in the shaping of a casing.

And Figure 5 is a section, showing a tire completely assembled in a mold in a condition ready for vulcanization.

The casing may be built flat or substantially flat and may be of a clincher or straight side type, the latter being illustrated in the drawings. The strain-resisting elements and rubber may be assembled as convenient and as fully disclosed in the aforesaid parent application.

According to the invention the pulley-band, however it may be fabricated or assembled, is initially distended or puffed with air in direct contact with its inner surface. The pressure of the air is increased so as to bulge the pulley-band within the range of action of an evacuating apparatus and then the casing is drawn and/or held in an approximate tire form by a vacuum applied externally thereto.

That is to say, the process contemplates an incomplete or a complete shaping of the pulley-band to approximately tire form by air pressure above atmospheric on its inner surface followed by the application of a vacuum to its outer surface to either finish the shaping, or to hold the completely shaped casing. The preferred procedure, however, is to employ air under pressure on the inside of the casing to bulge it into sealing engagement with an evacuating agency, then to shape the bulged pulley-band to approximately tire form by the creation of a vacuum on its outer surface, and then, while the tire is held by vacuum, to insert a vulcanizing bag. The progressive action that occurs is shown in Figures 2, 3, and 4 of the drawings. Preferably the bag is made of a substantial wall thickness capable alone of sustaining the casing in approximate tire form with or without fluid filling its interior after the vacuum is broken. The assembled casing and bag are mounted on rings and assembled in a vulcanizing mold. Then the tires are vulcanized in a press in a suitable and convenient manner, preferably, however, with fluid under pressure supplied to the interior of the bags through an inflating stem with which they are provided. In the process it is preferred to introduce the bag after the pulley-band has been shaped but optionally the vulcanizing bag may be buckled, crimped, or otherwise contracted into a form capable of being positioned within the flat pulley-band and of unfolding as the shaping operation progresses in which shaping operation it assists the differential of pressure applied to the opposite sides of the band or casing.

The process may be carried on in any suitable and convenient apparatus that shown in the drawings, however, being preferred because of its convenience and rapidity. Referring to Figure 1, 1 indicates a table preferably provided with a centering projection 2 and supporting an evacuating box, 3, and also stanchions 4 at whose upper extremities is mounted at a distance away from the table 1 a headplate 5 which in turn supports a cylinder 6. A piston (not shown) through a piston-rod 7 is adapted to be operated by the admission of fluid under pressure through the supply line 8 to opposite ends of the cylinder 6—the admission of the fluid being governed by a three-way valve 9 operable from the hand pull 10. A circular platen 11 on rod 7 thereby may be moved toward or from the table 1 which constitutes a second platen. The platen 11 is preferably but not necessarily equipped with a centering projection 12. It is to be noticed that the cylinder 6 permits the upper platen 11 to be moved a considerable distance away from the table 1, thereby affording access to the evacuating box or chamber 3.

The evacuating chamber or box may be variously constructed as disclosed fully in the aforesaid parent application. Concisely it comprises an outer wall 13 and top and bottom walls 14 and 15, respectively, the walls 13 and 14 being preferably but not necessarily integral. The top wall 15 is preferably made separate and removable by hinging it at one side, as at 16. A strip or gasket 17 of rubber or other suitable material may be employed to close the joint between the walls 13 and 15, the closure being sufficiently airtight to permit of exhausting air from the interior of the chamber through a valve controlled pipe line 18 connected to any suitable means for exhausting air from the chamber defined by the walls 13—14—15 and the pulley-band B. If desired a second valve controlled pipe line 19 may be placed in communication with the chamber constituted by the pulley-band B and the two platens 1 and 11 for the introduction of air above atmospheric pressure—if the size of the pulley-band B being shaped requires augmenting of the pressure developed in operation by a reduction of the distance between the two platens 1 and 11.

The walls 14 and 15 are preferably provided on their inner surfaces with grooves or an annular arrangement of notches 20 in immediate proximity to their inner free edges. Preferably channels (not shown) extend in a more or less radial direction from the grooves 20 outward to a distance beyond where the pulley-band B comes in contact with the walls 14 and 15 in order to maintain a vacuum, on the outside of the casing throughout the shaping operation, and also in order to hold the edges of the casing far enough apart to facilitate the introduction of the vulcanizing bag C.

In the illustrated embodiment the platen 11 only is shown movable toward the platen or table 1, this being the simplest form of construction, but obviously both platens may be made movable.

In operation the pulley-band is positioned on the table 1 as shown in Figure 1 of the drawings, the platen 11 then moved down upon the beads of the pulley-band Air at atmospheric pressure trapped within the compressor thus constituted is increased in pressure and consequently the pulley-band B is bulged more or less after the manner illustrated in Figure 2 of the drawings. In bulging or distending the pulley-band B makes contact with the lips of the vacuum chamber 3. About this time the evacuating line 18 is placed in communication with the interior of the vac-box 3 whereupon the pulley-band is drawn out quickly, practically instantaneously, to the shape shown in Figure 3 of the drawings. While so held by the vacuum the vulcanizing bag C is introduced. The vacuum line 18 is then closed. Then the cover or lid 15 is raised, the assembled tire and bag removed and mounted on an annular ring or rings 21 and assembled in a mold 22. Thus prepared for vulcanization, the tires are introduced in a press and vulcanized preferably, however, with air under relatively high pressure, supplied to the interiors to maintain a wall compacting pressure against the outside rigid mold sections.

In its broadest aspects, the invention contemplates the application of fluid under pressure in direct contact with the inner side of the pulley-band to effect either a partial or complete shaping of the tire followed by the application of a vacuum to the outside of the pulley-band to effect either the balance of the shaping necessary or a holding of the tire in approximately the shape it has arrived at while a bag is being positioned therein. Alternatively of course the bag may have been buckled and introduced in the pulley-band before the shaping operation is started in which case of course it will follow the pulley-band as it is progressively brought to tire form. The apparatus may of course be varied in construction and arrangement, mounted horizontally instead of vertically for instance or made with both platens movable instead of only one movable, or otherwise altered to adapt it to conditions arising in factory practice. The invention is not intended to be limited to the details above disclosed and reference is, therefore, made to the appended claims for an understanding of the scope of the invention.

Having thus described my invention, what I claim and desire to protect by Letters Patent is:

1. An apparatus for manufacturing tire casings for motor vehicles comprising in combination, means for vacuously shaping a pulley-band to tire form, and a press for initially bulging the pulley-band to a position in contact with said first-named means for shaping treatment thereby.

2. An apparatus for manufacturing tire casings for motor vehicles comprising a vacuum chamber, and means for exhausting air therefrom, in combination with a press for closing the sides of a pulley-band and compressing air trapped within the pulley-band to initially distend the flat casing to a position operative upon by the vacuum chamber.

3. An apparatus for manufacturing tire casings for motor vehicles comprising in combination, an annular chamber, means for exhausting air from the chamber, press members adapted to close the sides of the pulley-band and form therewith an air compressor, and means for moving at least one of the press members relative to the other to compress the air trapped within the pulley-band whereby a pulley-band casing may be initially distended to a position within operation of the vacuum chamber and subsequently shaped to approximately tire form.

4. An apparatus for manufacturing tire casings for motor vehicles comprising a vacuum chamber, and means for exhausting air therefrom, in combination with a press for closing the sides of a pulley-band and compressing air trapped within the pulley-band, said press having platens at least one of which is shiftable axially and centrally of said vacuum chamber.

Signed at Detroit, in the county of Wayne, State of Michigan, this 19th day of June, 1924.

ADRIAN OREN ABBOTT, JR.